US012668221B2

(12) United States Patent
Mazzoleni et al.

(10) Patent No.: US 12,668,221 B2
(45) Date of Patent: Jun. 30, 2026

(54) BRAKE-BY-WIRE BRAKING SYSTEM FOR VEHICLES, PROVIDED WITH ELECTRIC ACTUATION AND ELECTRIC BACK-UP

(71) Applicant: Brembo S.p.A., Curno (IT)

(72) Inventors: Samuele Mazzoleni, Curno (IT); Andrea Belloni, Curno (IT)

(73) Assignee: Brembo S.p.A., Curno (IT)

( * ) Notice: Subject to any disclaimer, the term of this patent is extended or adjusted under 35 U.S.C. 154(b) by 919 days.

(21) Appl. No.: 17/600,690

(22) PCT Filed: Apr. 3, 2020

(86) PCT No.: PCT/IB2020/053181
§ 371 (c)(1),
(2) Date: Oct. 1, 2021

(87) PCT Pub. No.: WO2020/202084
PCT Pub. Date: Oct. 8, 2020

(65) Prior Publication Data
US 2022/0161772 A1     May 26, 2022

(30) Foreign Application Priority Data
Apr. 5, 2019     (IT) ........................ 102019000005254

(51) Int. Cl.
*B60T 13/74*        (2006.01)
*B60T 8/92*         (2006.01)
(Continued)

(52) U.S. Cl.
CPC .................................... *B60T 8/94* (2013.01); *B60T 8/92* (2013.01); *B60T 13/745* (2013.01);
(Continued)

(58) Field of Classification Search
CPC ........ B60T 8/92; B60T 13/745; B60T 13/746; B60T 17/221
See application file for complete search history.

(56) References Cited

U.S. PATENT DOCUMENTS 6,189,981 B1 *  2/2001  Niedermeier  ........... B60T 13/74
                                                    303/122.04
11,648,917 B2 *  5/2023  Satoh  ...................... B60T 13/74
                                                    188/72.1

(Continued)

FOREIGN PATENT DOCUMENTS

CN        106458185 A       2/2017
CN        108367738 A       8/2018
(Continued)

OTHER PUBLICATIONS

State Intellectual Property Office, Notice of First Examination Opinion in Application No. CN2020800277677, dated Sep. 26, 2023, 10 pages.
(Continued)

*Primary Examiner* — Nicholas J Lane
(74) *Attorney, Agent, or Firm* — Marshall & Melhorn, LLC

(57) ABSTRACT

A braking system for vehicles may have a first brake group, a second brake group and a third brake group. A first and a second control unit may be provided for the brake groups. The first control unit may be connected to the first brake group by a piloting device for an actuator of the first brake group. The second control unit may be connected to the second brake group by a piloting device actuator of the second brake group. The second control unit may be connected to the third brake group by a piloting device for an actuator of the third brake group. The first control unit may be connected to a first power source, and the second control unit may be connected to a second power source. Each
(Continued)

control unit may be programmed to implement a standard braking strategy and a fault braking strategy.

16 Claims, 5 Drawing Sheets

(51) Int. Cl.

| | |
|---|---|
| *B60T 8/94* | (2006.01) |
| *B60T 17/22* | (2006.01) |
| *B60T 7/12* | (2006.01) |

(52) U.S. Cl.

CPC .......... *B60T 13/746* (2013.01); *B60T 17/221* (2013.01); *B60T 7/12* (2013.01); *B60T 2270/404* (2013.01); *B60T 2270/406* (2013.01); *B60T 2270/413* (2013.01); *B60T 2270/604* (2013.01); *B60T 2270/82* (2013.01)

(56) References Cited

U.S. PATENT DOCUMENTS

| | | | | |
|---|---|---|---|---|
| 2003/0006726 A1* | 1/2003 | Weiberle | ................. | B60T 17/18 |
| | | | | 318/370 |
| 2018/0056960 A1* | 3/2018 | Krueger | ................. | B60T 8/885 |

| | | | | |
|---|---|---|---|---|
| 2019/0299944 A1* | 10/2019 | Nilsson et al. | ......... | B60T 7/042 |
| 2020/0031323 A1* | 1/2020 | Satoh | .................... | B60T 17/221 |
| 2020/0039484 A1* | 2/2020 | Satoh | ..................... | B60T 7/042 |
| 2020/0254988 A1* | 8/2020 | Di Stefano | ............... | B60T 8/92 |
| 2020/0369256 A1* | 11/2020 | Bartels | ................. | B60T 17/221 |
| 2023/0125088 A1* | 4/2023 | Beuss | ................... | B60T 17/221 |
| | | | | 188/106 P |

FOREIGN PATENT DOCUMENTS

| | | | | |
|---|---|---|---|---|
| DE | 102011108297 A1 | 8/2012 | | |
| DE | 102014225958 A1 | 6/2016 | | |
| DE | 102016012617 A1 | 4/2018 | | |
| WO | 2009015962 A1 | 2/2009 | | |
| WO | 2018078560 A1 | 5/2018 | | |
| WO | WO-2019058204 A1 * | 3/2019 | ........... | B60T 13/662 |

OTHER PUBLICATIONS

European Patent Office, International Search Report and Written Opinion in Application No. PCT/IB2020/053181, dated Jun. 7, 2020, 12 pages, Rijswijk, Netherlands.

* cited by examiner

BRAKE-BY-WIRE BRAKING SYSTEM FOR VEHICLES, PROVIDED WITH ELECTRIC ACTUATION AND ELECTRIC BACK-UP

FIELD OF APPLICATION

The present invention relates to a brake by wire braking system for vehicles, provided with both electric actuation and with electric back-up.

BACKGROUND

The present invention relates to the field of brake by wire braking systems for vehicles.

In known brake by wire systems, the actuation of the braking devices does not take place by direct action of the driver, but the user's request for braking action, typically acting on a lever or pedal, is converted into drive by electromechanical means which act on the braking devices, such as for example disc brake calipers.

Autonomous braking systems are also known in which the steering system of the vehicle decides the timing and the amount of braking and consequently actuates said electro-mechanical means connected to the braking devices.

For obvious safety reasons, braking systems must provide a back-up strategy to be implemented in the event of an electrical fault of at least one braking device and/or the relative actuators.

In this regard, brake-by-wire braking systems are known, for example, in which, in the event of an electrical fault, the braking action is exerted mechanically, conventionally, i.e. by fluidically connecting the lever or pedal operated by the user to request the braking action, directly with said braking devices.

However, these systems have the drawback of requiring both the electrical system to be always operated under standard operating conditions, and the hydraulic system to be operated in the event of an electrical fault. The presence of the hydraulic system involves an increase in costs, masses, the management of highly hygroscopic hydraulic fluid, the management and maintenance of hydraulic fluid seals and so on.

In addition, hydraulic back-up solutions are not applicable to self-driving vehicles and do not always guarantee maximum braking efficiency in the event of hydraulic back-up.

There are also full-electric solutions that do without the hydraulic part of the braking system and that, in the event of an electrical fault, put in place back-up strategies to ensure a partial restoration of the braking capacity of the system and therefore the performance of the braking itself, although non-optimal. However, these solutions are not optimal and, in the event of a fault, do not always guarantee optimal braking.

SUMMARY

The need to solve the drawbacks and limitations mentioned with reference to the prior art is therefore increasingly felt.

This requirement is met by a braking system for vehicles according to the claims claim 1.

In particular, this need is met by a braking system for vehicles comprising a first brake group, a second brake group and a third brake group, each intended for braking a distinct wheel of a vehicle, each brake group comprising a rotor, a braking device associated with said rotor, electro-hydraulic or electro-mechanical actuators of each braking device, a first and a second control unit for said brake groups, wherein the first control unit is operatively connected to the first brake group by means of a piloting device for said electromechanical or electro-hydraulic actuator of the first brake group, wherein the second control unit is operatively connected to the second brake group by means of a piloting device for said electromechanical or electro-hydraulic actuator of the second brake group, and is connected to the third brake group by means of a piloting device for electro-mechanical or electro-hydraulic actuator of the third brake group, wherein the first control unit is connected to and powered by a first power source, and wherein the second control unit is connected to and powered by a second power source, said first and second power sources being independent and galvanically isolated from each other, each control unit being programmed to implement, via the corresponding piloting device, a standard braking strategy in case of malfunctions for each brake group and a fault braking strategy, if it detects an electrical fault of one or more of the brake groups.

According to an embodiment, the first control unit is operatively connected also to the third brake group by means of a piloting device for the electromechanical or electro-hydraulic actuator of the third brake group.

According to an embodiment, the electromechanical actuator comprises a 6-phase electric motor which pilots said third brake group, wherein the first and second control units comprise a piloting device operatively connected to said 6-phase electric motor and capable of actuating it.

According to an embodiment, the first control unit is operatively connected to the first brake group, to the second brake group and to the third brake group by means of three relative piloting devices, wherein the second control unit is operatively connected to the first brake group, to the second brake group and to the third brake group by means of a three relative piloting devices, said piloting devices being independent of each other.

According to an embodiment, each brake group is piloted by a 6-phase electric motor connected to pairs of piloting devices, each piloting device of said pair being controlled by a relative control unit.

According to an embodiment, the system comprises a first and a second manual actuation device for a request for a braking action by a user, wherein both the manual actuation devices are provided with two actuation sensors, a first actuation sensor being connected to the first control unit and a second actuation sensor being connected to the second control unit.

According to an embodiment, each control unit is connected to said first and second power sources so that it can be alternately powered by each of said power sources in the event of a fault of one of them.

According to an embodiment, an additional control unit programmed to manage the power supply of each control unit is provided.

According to an embodiment, each piloting device is programmed to switch from a first switch position, corresponding to the standard braking strategy, to a second switch position corresponding to the fault-braking strategy.

According to an embodiment, the first and the second control units are operatively connected to each other so that each knows the type of operation, standard or fault, implemented by the other control unit.

According to an embodiment each electromechanical actuator is equipped with an operating sensor suitable to monitor the operating condition of the relative electromechanical or electro-hydraulic actuator and/or of the relative braking device and to send the corresponding control unit an indication of standard or fault operation.

According to an embodiment the control units are programmed so that in case of fault of a brake group, the actuation of the remaining brake groups is ensured and coordinated.

According to an embodiment, the control units are programmed so that in the event of a fault of one brake group the actuation of the remaining brake units is guaranteed, and wherein the braking system is operatively connected to a piloting device of the vehicle, so as to coordinate the actuation of the piloting device with the actuation of the operating brake units.

According to an embodiment, the control units are programmed so that in the event of a fault in a brake group, the operation of the remaining brake groups is guaranteed and coordinated, wherein the braking system is operatively connected to electrical power generation means operatively connected to the brake groups so as to obtain an additional braking action of the vehicle.

According to an embodiment each electromechanical or electro-hydraulic actuator is equipped with two operating sensors, each suitable to monitor the operating condition of the relative electromechanical actuator and/or of the relative braking device and to send an indication of standard or fault operation to both the control units.

According to an embodiment the system is managed by a control unit of the vehicle which manages vehicle dynamics and is able to perform guidance and an independent braking action of the same.

DESCRIPTION OF THE DRAWINGS

Further features and advantages of the present invention will appear more clearly from the following description of preferred non-limiting embodiments thereof, in which:

FIG. 6 Represents a schematic view of a possible embodiment of a braking system according to the present invention.

Elements or parts of elements in common to the embodiments described below are referred to with the same reference numerals.

DETAILED DESCRIPTION

Figure 1:
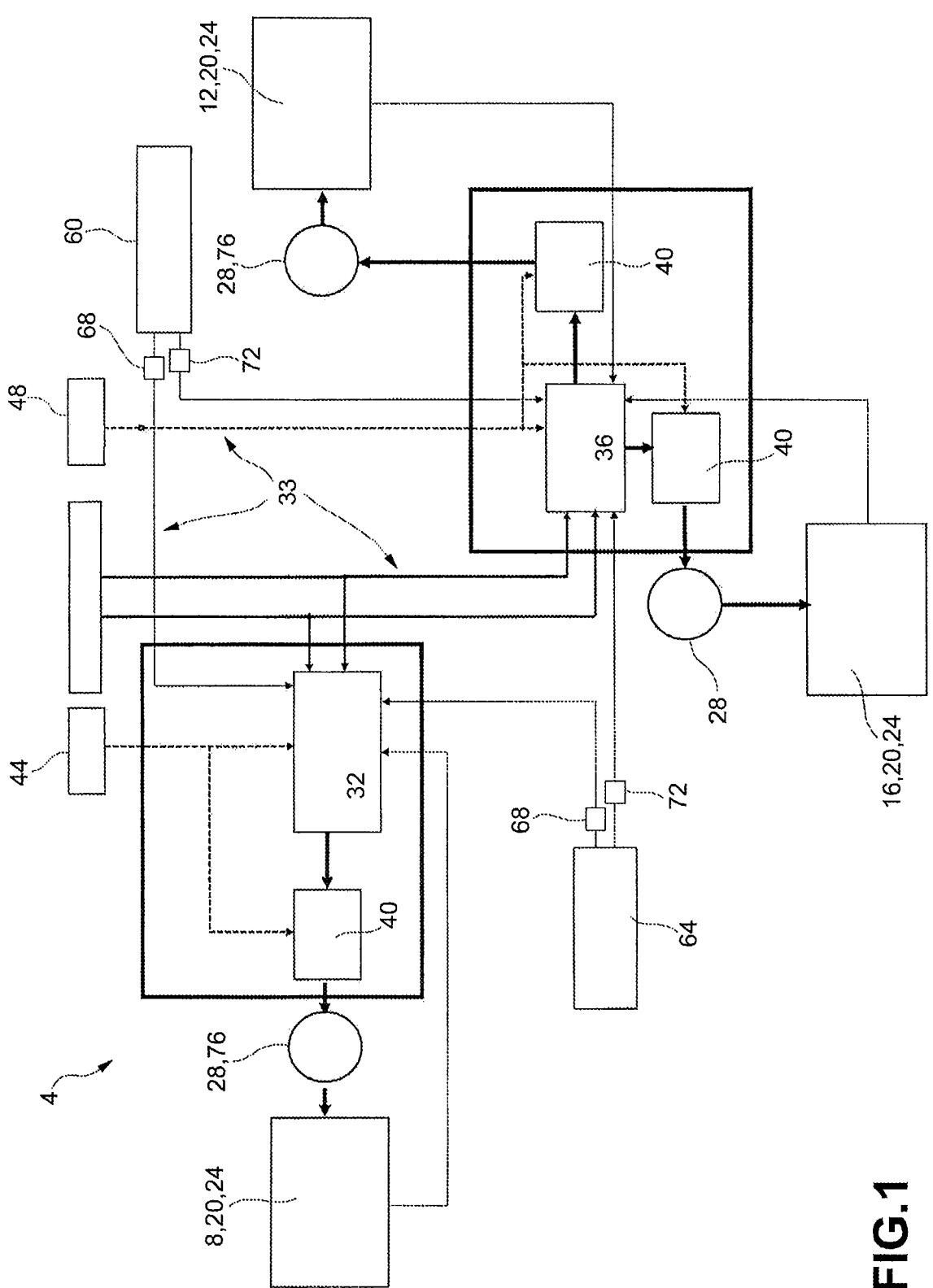
FIG. 1 Represents a schematic view of a possible embodiment of a braking system according to the present invention.

With reference to the above figures, reference numeral 4 globally denotes a braking system for vehicles.

For the purposes of the present invention, vehicles means motor vehicles equipped with at least two wheels.

In particular, the vehicle braking system 4 comprises at least a first brake group 8, a second brake group 12 and a third brake group 16.

Said first, second and third brake groups 8, 12, 16 can each be associated with a distinct wheel (not shown), in the case of three-wheeled vehicles, for the relative braking thereof.

In the case of a two-wheeled vehicle, it is possible to associate two brake groups to the same wheel (for example the front wheel of a motorcycle) and a brake group to the other wheel (for example the rear wheel).

For the purposes of the present invention, said brake groups may be associated with wheels arranged on different axles of the vehicle, such as for example a front axle and a rear axle of the vehicle itself. In the case of a two-wheeled vehicle, two brake groups must be mounted on the same axle.

Each brake group 8, 12, 16 comprises a rotor 20 which rotates integrally with the wheel to be braked and a braking device 24 configured for braking said rotor 20 and the corresponding wheel.

The type of rotor depends on the type of braking device used.

For example, in the case of a braking device of the drum brake type, the rotor will comprise a bell, in the case of a braking device 24 with disc brake, the rotor 20 will comprise a brake disc, in a known manner.

Each brake group 8, 12, 16 further comprises electromechanical or electro-hydraulic actuators 28 of each braking device 24.

The electromechanical or electro-hydraulic actuators 28 may comprise electric motors configured in such a way as to enable and disable the braking devices 24. For example, said electromechanical actuator means 28 may comprise an electric motor connected, by means of a worm screw mechanism, to a pusher for at least one piston acting on a pad of a disk brake caliper.

In the case of electro-hydraulic actuators, it is possible to provide for the use of mechanical means which pressurize a fluid which in turn actuates, remotely, said braking devices 24.

Advantageously, the braking system 4 comprises a first and a second control unit 32,36 for said brake groups 8,12,16.

According to an embodiment (FIGS. 1-2), the first control unit 32 is operatively connected to the first brake group 8 by means of a piloting device 40 for said electromechanical or electro-hydraulic actuator 28 of the first brake group 8.

Moreover, the second control unit 36 is operatively connected to the second brake group 12 by means of a piloting device 40 for said electromechanical or electro-hydraulic actuator 28 of the second brake group 12, and is connected to the third brake group 16 by means of a piloting device 40 for electromechanical or electro-hydraulic actuator 28 of the third brake group 16.

In this way, a control unit controls only one brake group (for example the first one) and the other control unit controls two brake groups, for example the second and the third.

Preferably, the piloting devices 40 of the various brake groups 8, 12, 16 are electrically and mechanically independent and separate from each other.

The first control unit 32 is connected to and powered by a first power source 44, and the second control unit 36 is connected to and powered by a second power source 48.

Advantageously, said first and second power sources 44,48 are independent and galvanically isolated from each other.

The power source is typically a lead battery, a lithium ion battery and the like.

The separate power supply of said power sources 44, 48 guarantees the correct operation of at least one brake group 8, 12, 16 in the event of an electrical fault of one of said power sources 44, 48.

Preferably, each control unit 32,36 is connected to said first and second power sources 44,48 so that it can be alternately powered by each of said power sources 44,48 in the event of a fault of one of them. In this way, the fault of a power source does not affect the operation of any control unit 32, 36, of the respective piloting devices 40 and electromechanical and/or electro-hydraulic actuators 28.

For example, an additional control unit 56 or a dedicated electronic circuit programmed to manage the power supply of each control unit 32,36 is provided.

In particular, each control unit 32,36 is programmed to implement, via the corresponding piloting system 40, a standard braking strategy in case of malfunctions for each brake group 8, 12, 16 and a fault braking strategy, if it detects an electrical fault of one or more of the brake groups 8, 12, 16.

Standard operation means a normal operating condition in which there are no anomalies in the braking system that is able to exert the braking action requested by the user or by the autonomous driving system of the vehicle (if provided).

Electric fault condition means a malfunction of a brake group 8,12,16, for example of the power sources 44,48, of the piloting devices 40, of the electromechanical or electro-hydraulic actuators 28 that partially or totally prevents the operation thereof.

Moreover, "fault" means a generic condition of malfunction which may include a problem both to the mechanical components (braking devices 24 and/or electromechanical or electro-hydraulic actuators 28) and to the electrical/electronic components, but may also comprise a software problem of management of the control unit 32,36, reading of the data concerning the operation of the braking system 4 and the like.

Each piloting device 40 is programmed to switch from a first switch position, corresponding to the standard braking strategy, to a second switch position corresponding to the fault-braking strategy.

Preferably, the first and the second control units 32,36 are operatively connected to each other so that each knows the type of operation, standard or fault, implemented by the other control unit 32,36.

In this way, each control unit allows the operation of the other unit and of the respective devices connected to it, so as to have information on the operation of the entire braking system 4.

Preferably, the control units 32,36 are programmed so that in case of fault of a brake group, the actuation of the remaining brake groups is ensured and coordinated.

According to an embodiment, the control units 32,36 are programmed so that in the event of a fault of one brake group the actuation of the remaining brake units is guaranteed, and the braking system 4 is operatively connected to a piloting device of the vehicle (not shown), so as to coordinate the actuation of the piloting device with the actuation of the operating brake units. In this way, it is possible to obtain a complete management of the vehicle stability control.

According to a further possible embodiment, the control units 32,36 are programmed so that in the event of a fault in a brake group, the operation of the remaining brake groups is guaranteed and coordinated, and the braking system is operatively connected to electrical power generation means operatively connected to the brake groups so as to obtain an additional braking action of the vehicle.

In other words, due to regenerative braking, it is possible to obtain a further braking effect which can compensate for malfunctions of the brake groups applied to each wheel.

The braking system 4 may also be managed by a control unit of the vehicle which manages vehicle dynamics and is able to perform guidance and an independent braking action of the same.

Figure 2:
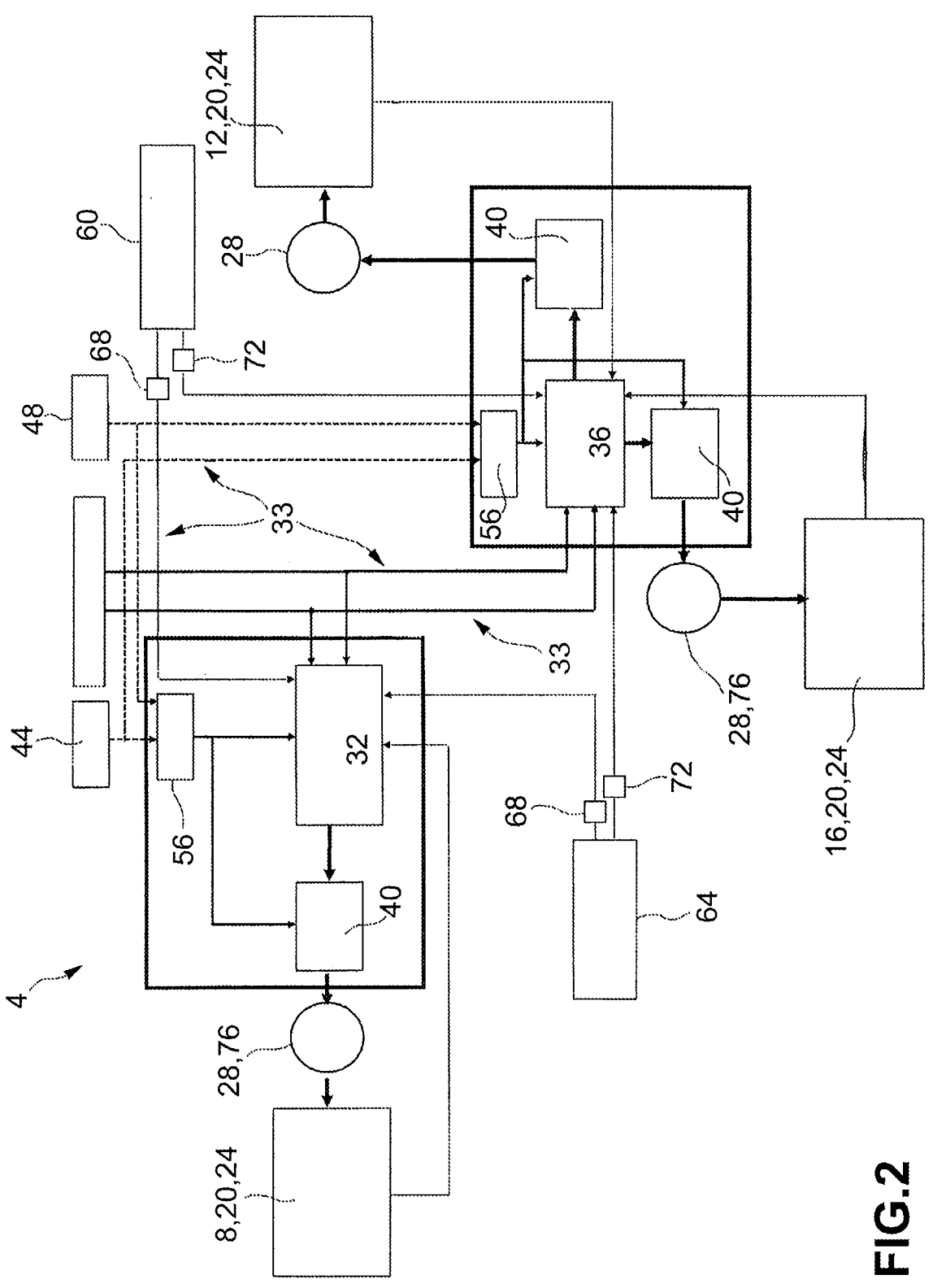
FIG. 2 Represents a schematic view of a possible embodiment of a braking system according to the present invention.

In the embodiments of FIGS. 1-2, the braking system always guarantees the operation of a brake group 8, 12, 16 in the event of an electrical fault.

According to a possible embodiment (FIGS. 3-4), the first control unit 32 is operatively connected not only to the first brake group 8 but also to the third brake group 16 by means of a piloting device 40 for the electromechanical or electro-hydraulic actuator 28 of the third brake group 16.

For example, in this embodiment (FIGS. 3-4), the electromechanical or electro-hydraulic actuators 28 comprise a 6-phase electric motor 52 which pilots said third brake group 16, wherein the first and second control units 32,36 are connected to a piloting device 40 operatively connected to said 6-phase electric motor 52.

Figure 3:
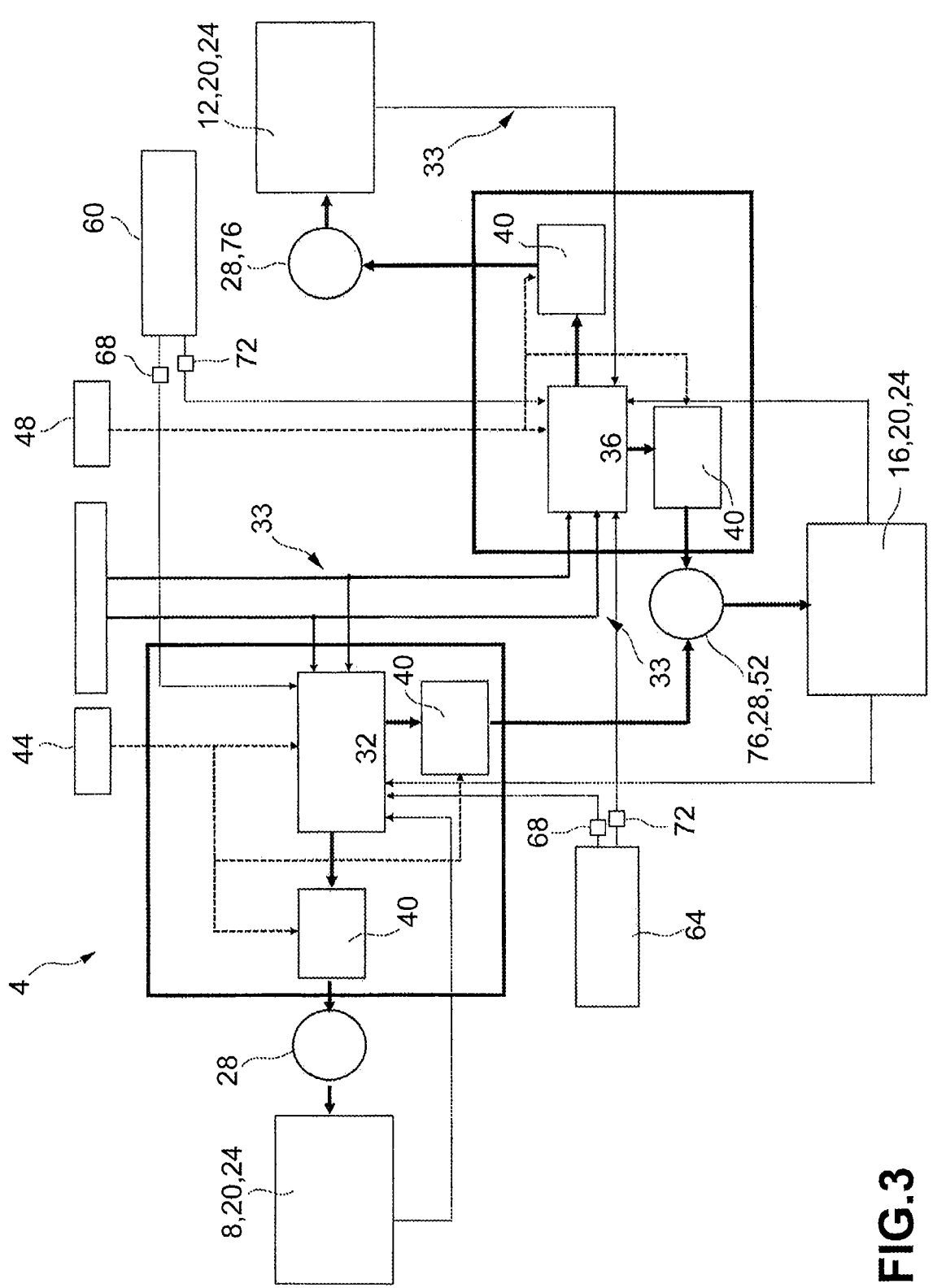
FIG. 3 Represents a schematic view of a possible embodiment of a braking system according to the present invention.
Figure 4:
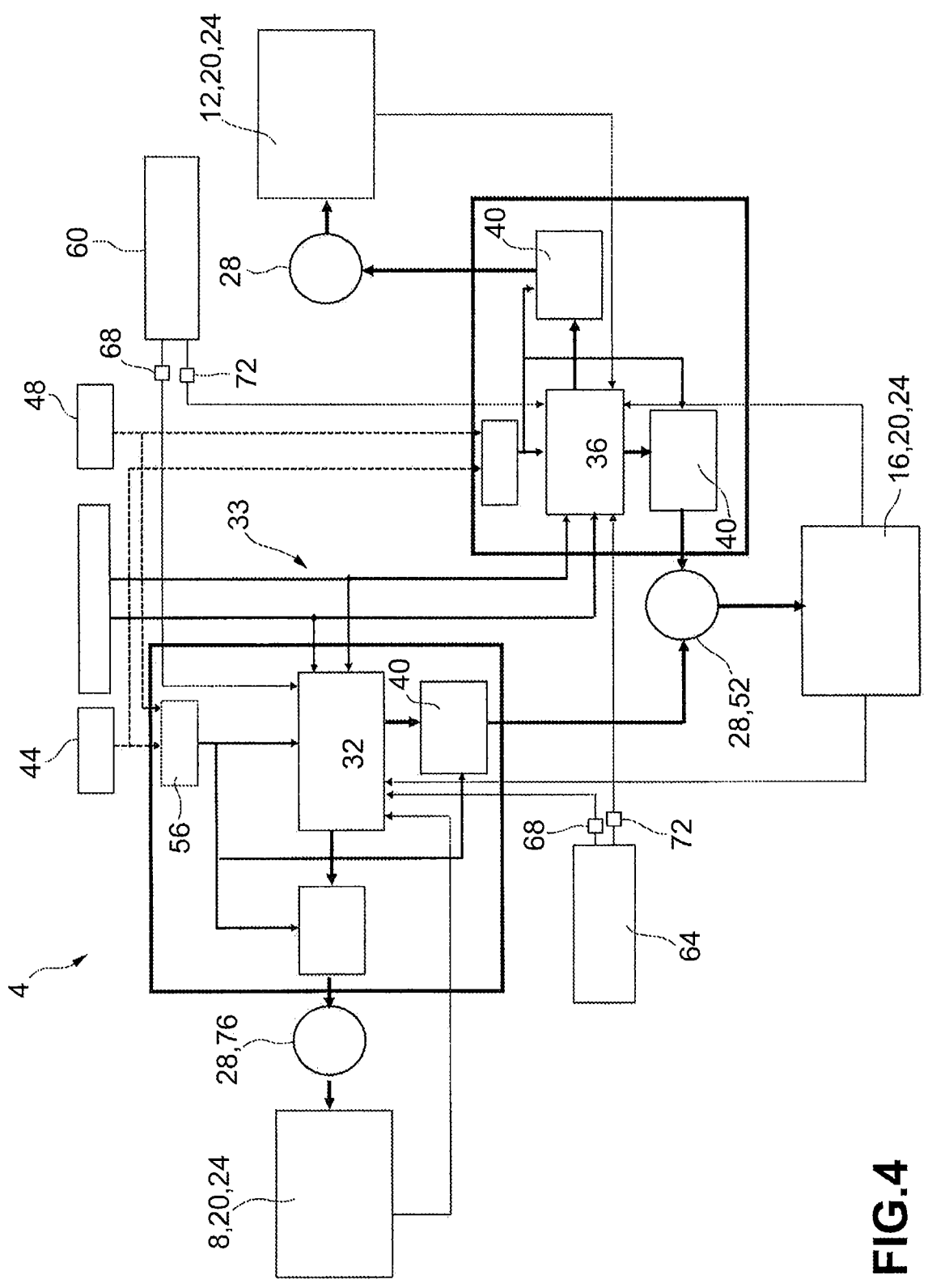
FIG. 4 Represents a schematic view of a possible embodiment of a braking system according to the present invention.

The braking system of FIGS. 3-4, in the event of an electrical fault, guarantees the operation of two brake groups 8,12,16.

According to a further embodiment (FIGS. 5-6), the first control unit 32 is operatively connected to the first brake group 8, the second brake group 12 and the third brake group 16 by means of three relative piloting devices 40. Moreover, the second control unit 36 is operatively connected to the first brake group 8, the second brake group 12 and the third brake group 16 by means of three relative piloting devices 40, said piloting devices 40 being independent of each other.

In this embodiment, each brake group 8,12,16 is piloted by a 6-phase electric motor 52 connected to pairs of piloting devices 40, each piloting device 40 of said pair being controlled by a relative control unit 32,36.

Figure 5:
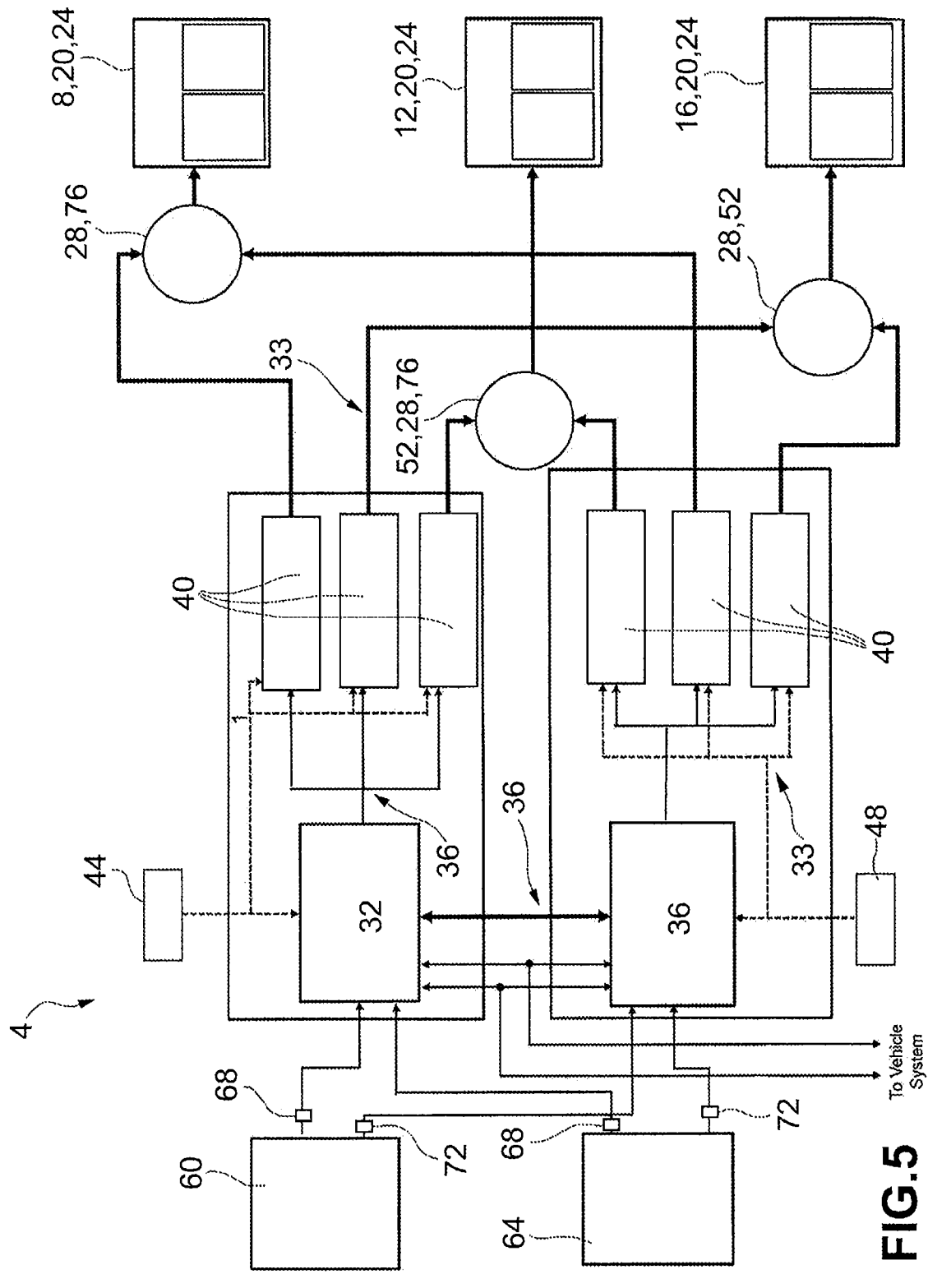
FIG. 5 Represents a schematic view of a possible embodiment of a braking system according to the present invention.

The braking system of FIGS. 5-6, in the event of an electrical fault, guarantees the operation of all the three brake groups 8,12,16.

The braking system 4 according to the present invention usually comprises a first and a second manual actuation device 60,64 for the request of braking action by a user.

Preferably, both manual actuation devices 60,64 are equipped with two actuation sensors 68,72, a first actuation sensor 68 being connected to the first control unit 32 and a second actuation sensor 72 being connected to the second control unit 36. Thus, in a vehicle in which there are two independent brake controls (for example a motorcycle) in the event of a failure of a control unit, the other can continue to brake according to both requests received through both controls.

According to an embodiment, each electromechanical or electro-hydraulic actuator 28 is equipped with an operating sensor 76 suitable to monitor the operating condition of the relative electromechanical or electro-hydraulic actuator 28 and/or of the relative braking device 24 and to send the corresponding control unit 32,36 an indication of standard or fault operation.

According to a further embodiment each electromechanical or electro-hydraulic actuator 28 is equipped with two operating sensors 76, each suitable to monitor the operating condition of the relative electromechanical or electro-hydraulic actuator 28 and/or of the relative braking device 24 and to send an indication of standard or fault operation to both the control units 32,36.

It should be noted that the operational connections between the various electrical, electromechanical components of the devices of the braking system 4 according to the invention may take place by means of an electric line and/or a data transmission line 33, for example of the CAN type. In this way, the control units, having detected a fault condition, can manage the vehicle braking by implementing the fault strategy.

As can be appreciated from the foregoing, the braking system for vehicles according to the invention overcomes the drawbacks of the prior art.

In fact, the braking system allows completely eliminating the part of hydraulic backup and in general of backup that requires the manual intervention of the operator typical of traditional braking systems without losing in reliability or safety, even in case of fault.

The elimination of the backup part of the system allows reducing overall the system masses, the hydraulic lines and all the sealing problems connected to them. Furthermore, it is not necessary to periodically replace the braking fluid, due to its strong hygroscopicity.

Furthermore, the system of the present invention lends itself well to being integrated into a self-driving or in any case assisted-drive full-electric vehicle, in which the braking action can be controlled autonomously by a control unit which is responsible for driving and controlling the vehicle.

Furthermore, the system of the present invention also lends itself well to non-autonomous driving solutions in which the user manually requests the braking action.

Furthermore, the braking system guarantees the safety of the braking even in the event of an electrical fault.

In fact, the system is capable of:

ensuring the operation of at least one brake group even in the event of an electrical fault, identifying exactly the type and positioning of the fault within the braking system, adapting the braking strategy to the actual operating conditions of the system, preserving the stability of the vehicle in all operating conditions.

With regard to the operation of the brake groups in the event of an electrical fault, the present invention provides three embodiments with different operating safety devices, in particular:

the embodiment of FIGS. 1-2 allows the operation of one brake group in the event of an electrical fault;

the embodiment of FIGS. 3-4 allows the operation of two brake groups, in the event of an electrical fault;

the embodiment of FIGS. 5-6 allows the operation of all three brake groups, in the event of an electrical fault.

Moreover, as seen, it is possible to compensate for malfunctions of a wheel group either by acting on vehicle steering control systems or by acting on regenerative braking devices.

In the first case, a vehicle check is carried out, for example to correct yawing phenomena, in the second case an additional braking action is obtained to reduce the speed thereof. Obviously, the two actions may be combined with each other.

Therefore, the system of the present invention has the same level of reliability and safety of a traditional hydraulic braking system, without the drawbacks of hydraulic backups and without the need for manual backup by an operator, with the advantage that it can also be used on a self-driving vehicle.

A man skilled in the art, in order to meet contingent and specific requirements, may make several modifications and variants to the brake systems for vehicles described above, all of which fall within the scope of the invention as defined by the following claims.

What is claimed is:

1. A braking system for vehicles comprising a first brake group, a second brake group and a third brake group, each brake group comprising a rotor, a braking device associated with said rotor, and an electro-hydraulic or electromechanical actuator of each braking device, a first and a second control unit for said brake groups, wherein the first control unit is operatively connected to the first brake group by a first piloting device for said electromechanical or electro-hydraulic actuator of the first brake group, wherein the second control unit is operatively connected to the second brake group by a second piloting device for said electromechanical or electro-hydraulic actuator of the second brake group, and is connected to the third brake group by a third piloting device for the electromechanical or electro-hydraulic actuator of the third brake group, wherein the first control unit is connected to and powered by a first power source, and wherein the second control unit is connected to and powered by a second power source, said first and second power sources being independent and galvanically isolated from each other, each control unit being programmed to implement, via the corresponding piloting system, a standard braking strategy in case of malfunctions for each brake group and a fault braking strategy, if it detects an electrical fault of one or more of the brake groups, wherein the braking system comprises a first and a second manual actuation device for a request for a braking action by a user, wherein both the manual actuation devices are each provided with exactly two separate actuation sensors, wherein the exactly two actuation sensors each consist of (i) a first actuation sensor electrically coupled only to the first control unit and (ii) a second actuation sensor electrically coupled only to the second control unit, wherein the first sensor and second sensor are on different signal paths corresponding to the galvanically isolated first and second power sources.

2. The vehicle braking system according to claim 1, wherein each control unit is connected to said first and second power sources so that it can be alternately powered by each of said power sources in the event of a fault of one of them.

3. The vehicle braking system according to claim 2, wherein an additional control unit or a dedicated electrical circuit programmed to manage the power supply of each control unit is provided.

4. The braking system according to claim 1, wherein each piloting device is programmed to switch from a first switch position, corresponding to the standard braking strategy, to a second switch position corresponding to the fault-braking strategy.

5. The vehicle braking system according to claim 1, wherein each electromechanical or electro-hydraulic actuator is equipped with an operating sensor suitable to monitor the operating condition of the relative electromechanical or electro-hydraulic actuator and/or of the relative braking device and to send the corresponding control unit an indication of standard or fault operation.

6. The vehicle braking system according to claim 1, wherein the control units are programmed so that in case of fault of one of the first brake group, the second brake group, or the third brake group, the actuation of the remaining brake groups is ensured and coordinated.

7. The vehicle braking system according to claim 1, wherein the control units are programmed so that in the event of a fault of one of the first brake group, the second brake group, or the third brake group, the actuation of the remaining brake groups is ensured and coordinated, wherein the braking system is operatively connected to an electricity generating device operatively connected to the brake groups so as to obtain an additional braking action of the vehicle.

8. The vehicle braking system according to claim 4, wherein each electromechanical or electro-hydraulic actuator is equipped with two operating sensors, each suitable to monitor the operating condition of the relative electromechanical or electro-hydraulic actuator and/or of the relative braking device and to send an indication of standard or fault operation to both the control units.

9. The vehicle braking system according to claim 1, wherein the system is managed by a control unit of the vehicle which manages vehicle dynamics and is able to perform guidance and an independent braking action of the same.

10. The vehicle braking system according to claim 1, wherein at least two of said brake groups are associated with a first vehicle wheel and wherein the third brake group is associated with a second vehicle wheel, distinct from the first wheel.

11. The vehicle braking system according to claim 1, wherein each of said first, second and third brake groups is associated with a respective and distinct wheel of a vehicle.

12. The vehicle braking system according to claim 1, wherein the first control unit determines the braking request based only on data from the first actuation sensors.

13. The vehicle braking system according to claim 1, wherein the second control unit determines the braking request based only on data from the second actuation sensors.

14. The vehicle braking system according to claim 1, wherein each sensor sends data to only one control unit.

15. The vehicle braking system according to claim 1, wherein each control unit receives data from only two sensors.

16. The vehicle braking system according to claim 1, wherein the first control unit and the second control unit determine a braking request independently from one another.

* * * * *